United States Patent [19]
Miksic et al.

[11] Patent Number: 5,750,053
[45] Date of Patent: May 12, 1998

[54] CORROSION INHIBITOR FOR REDUCING CORROSION IN METALLIC CONCRETE REINFORCEMENTS

[75] Inventors: Boris A. Miksic, North Oaks; Christophe Chandler, Woodbury; Margarita Kharshan, Little Canada; Alla Furman, Shoreview; Barry Rudman, Woodbury; Larry Gelner, St. Paul, all of Minn.

[73] Assignee: Cortec Corporation, St. Paul, Minn.

[21] Appl. No.: 594,597

[22] Filed: Jan. 31, 1996

Related U.S. Application Data

[63] Continuation-in-part of Ser. No. 377,761, Jan. 24, 1995, Pat. No. 5,597,514.

[51] Int. Cl.$^6$ .................. C09K 3/00; C04B 9/02; C04B 40/00; C04B 7/32; C04B 24/00
[52] U.S. Cl. .................. 252/389.52; 252/389.54; 252/389.62; 252/394; 252/396; 252/387; 106/14.05; 106/14.14; 106/14.13; 106/14.17; 106/14.44; 106/690; 106/692; 106/713; 106/819; 106/14.42; 422/7; 422/16; 422/17
[58] Field of Search ................... 252/394, 396, 252/389.62, 387, 389.52, 389.54; 422/7, 16, 17; 106/14.05, 14.14, 14.13, 14.42, 14.44, 14.16, 14.17, 690, 692, 713, 819, 810, 823, 728, 729, 730, 727

[56] References Cited

U.S. PATENT DOCUMENTS

| | | | |
|---|---|---|---|
| 2,941,953 | 6/1960 | Hatch | 252/389 |
| 3,537,869 | 11/1970 | Proell | 106/95 |
| 3,589,859 | 6/1971 | Foroulis | 422/17 |
| 3,625,286 | 12/1971 | Parker | 166/291 |
| 3,726,817 | 4/1973 | Niswonger | 260/9 |
| 3,748,159 | 7/1973 | George | 106/90 |
| 3,751,387 | 8/1973 | Hall et al. | 252/478 |
| 3,789,051 | 1/1974 | Rees et al. | 260/41 |
| 3,852,213 | 12/1974 | Cooney | 252/181 |
| 4,242,214 | 12/1980 | Lambert, Jr. | 252/75 |
| 4,315,889 | 2/1982 | McChesney et al. | 422/7 |
| 4,337,094 | 6/1982 | Tokar | 106/90 |
| 4,391,645 | 7/1983 | Marcellis et al. | 106/90 |
| 4,402,847 | 9/1983 | Wilson et al. | 252/75 |
| 4,410,367 | 10/1983 | LeGrand | 106/308 |
| 4,512,915 | 4/1985 | Lumaret et al. | 252/389 |
| 4,642,137 | 2/1987 | Heitzmann et al. | 106/85 |
| 4,662,942 | 5/1987 | Koga et al. | 106/90 |
| 4,693,829 | 9/1987 | Boffardi | 210/697 |
| 4,746,367 | 5/1988 | Meyer | 106/314 |
| 4,758,363 | 7/1988 | Sung et al. | 252/515 R |
| 4,759,864 | 7/1988 | Van Neste et al. | 252/75 |
| 4,975,219 | 12/1990 | Sato et al. | 252/388 |
| 4,990,191 | 2/1991 | Schilling | 106/805 |
| 4,997,484 | 3/1991 | Gravitt et al. | 106/708 |
| 5,000,916 | 3/1991 | Vukasovich et al. | 422/14 |
| 5,039,454 | 8/1991 | Policastro | 252/610 |
| 5,104,562 | 4/1992 | Kardos et al. | 252/79 |
| 5,175,277 | 12/1992 | Rakitsky et al. | 536/114 |
| 5,244,600 | 9/1993 | Cuisia et al. | 252/396 |
| 5,326,529 | 7/1994 | Miksic et al. | 422/7 |
| 5,422,141 | 6/1995 | Hoopes et al. | 427/299 |
| 5,435,845 | 7/1995 | Villa et al. | 106/804 |

OTHER PUBLICATIONS

EP 652305, May 10, 1995, (Derwent Abstract).
Mater. Perform. (1983), 22(6), 13–16, chemical abstract 99:93449 only.
CS 261986, May 15, 1989, chemical abstract 112:101304 only.
SU 1689329, Nov. 7, 1991, (Derwent Abstract).
JP 56125259, Oct. 1, 1981, (Derwent Abstract).
JP 54126229 Oct. 1, 1979, (Derwent Abstract).
JP 54024937, Feb. 24, 1979, (Derwent Abstract).
JP 60067681, Apr. 18, 1985, (Derwent Abstract).
JP 56125267, Oct. 1, 1981, (Derwent Abstract).
JP 0149362, Sep. 14, 1982, Derwent Abstract 89637E/42 only.

*Primary Examiner*—José G. Dees
*Assistant Examiner*—Deanna Baxam
*Attorney, Agent, or Firm*—Haugen and Nikolai, P.A.

[57] ABSTRACT

A corrosion inhibitor formulation for use in reinforced concrete structures, the inhibitor reducing the rate of corrosion in metallic reinforcing rods placed within the structures. The formulation comprises a mixture of alkali metal glucoheptonates and alkali metal molybdates.

2 Claims, No Drawings

5,750,053

1

CORROSION INHIBITOR FOR REDUCING CORROSION IN METALLIC CONCRETE REINFORCEMENTS

CROSS-REFERENCE TO RELATED APPLICATION

This is a continuation-in-part of our application Ser. No. 08/377,761, filed Jan. 24, 1995 now U.S. Pat. No. 5,597,514, issued Jan. 28, 1997, and entitled "CORROSION INHIBITOR FOR REDUCING CORROSION IN METALLIC CONCRETE REINFORCEMENTS" and assigned to the same assignee as the present invention.

BACKGROUND OF THE INVENTION

The present invention relates generally to corrosion inhibitors for use in reinforced concrete structures, and more particularly to corrosion inhibitors for reducing the rate of corrosion in metallic reinforcing rods placed within structures formed of concrete. The composition of the present information performs the corrosion inhibiting function through the use of ecologically acceptable materials, and at the same time, reducing the overall concentration of other components. The present inhibitor is designed for use either in admixture with raw concrete when provided on an in-situ basis within the concrete mixing, or alternatively may be effectively utilized on reinforcing materials within existing structures. The inhibitors of the present invention do not adversely affect the other properties of the concrete.

Concrete structures, particularly highways and bridges typically utilize metallic reinforcement members embedded therewithin to provide stability and additional strength to the concrete, and to enhance the ability of the concrete to withstand shear forces. These reinforcements are used in a variety of configurations, and are typically present in the form of reinforcing rods, wire mesh, metallic fibers, and the like. Reinforcements are usually situated in regular intervals within the cured concrete by pouring raw or uncured concrete therearound or, in the case of metallic fibers, added during the concrete mixing operation, for subsequent curing. The term "raw concrete" is utilized in a comprehensive sense, and is intended to relate to wet workable concrete mixtures which have not yet cured to their solid form. Upon the passage of time, the metallic reinforcements have a tendency to corrode as external elements such as moisture, atmospheric pollutants such as carbon dioxide, oxides of sulfur, oxides of nitrogen, hydrogen sulfide, road treatment chemicals permeate along and through the concrete structure and reach the surface of the metal reinforcement. When utilized in highways, bridges, and parking structures, chlorides including sodium chloride and calcium chloride may permeate the concrete structure due to the widespread utilization of such materials as a mechanism to melt ice and snow from the road surfaces. Both calcium chloride and sodium chloride are widely used for this purpose, and their use, although necessary for safety reasons, has been criticized for rapid deterioration of certain concrete structures. It is a common objective to utilize ecologically friendly components wherever possible. In this connection, the formulation of the present invention provides for the use of ecologically friendly materials, and thus the goals and objectives of inhibiting corrosion in large structures can be undertaken without significantly adding to the utilization of ecologically unfriendly materials.

In order to facilitate the access of inhibitors to concrete reinforcements, including particularly the surfaces of concrete reinforcements, it is normally desirable for corrosion inhibitors to be added to the raw concrete mixture in order to provide for contact with the surfaces of the metallic reinforcement members or structures. The corrosion inhibitor added in this fashion normally migrates at a rate sufficient to provide ongoing protection over relatively extended periods of time, and hence has an ability to protect the metallic reinforcements over such a period of time. It is, of course, always possible to boost the effectiveness of the inhibitor on a post-cure basis, provided the inhibitor can be placed within the body of the concrete. In those situations where the concrete structure is already in place with its reinforcement encapsulated therewithin, it is always desirable to have a corrosion inhibitor available which can be applied to the surface of the concrete structure and thereafter migrate inwardly to protect the surface of the metallic reinforcements. The formulations of the present invention, because of their water solubility, are designed for application at points along the concrete structure where reinforcements are exposed. In this manner, an aqueous solution of the inhibitor may migrate inwardly along the surface of the reinforcement so as to provide protection over a period of time.

SUMMARY OF THE INVENTION

In accordance with the present invention, a formulation has been developed which is readily adapted for use in admixture with raw or wet concrete mixtures, and which provides long-lasting and reliable corrosion inhibiting properties for metallic reinforcements. The formulation of the present invention utilizes a quantity of ecologically friendly components, and at the same time, reduces the quantity of components which could be characterized as ecologically unfriendly. Moreover, when employed in admixture with raw concrete, the formulations of the present invention facilitate the inhibition of corrosion while, at the same time, do not adversely impact or affect the curing rate or ultimate strength of the concrete in which it is added.

Briefly, and in accordance with a preferred formulation of the present invention, a glucoheptonate salt has been utilized in admixture with a passivating inhibitor consisting essentially of sodium molybdate, with a synergistic effect of hindrance of corrosion having been observed. While the precise mechanism involved in the passivation is not fully known, it has been recognized that glucoheptonate adsorption may be providing some of the inhibiting mechanism, or possibly the formation of a soluble iron glucoheptonate complex resulting in the metal dissolution may be contributing to the synergistic effect of metal passivation.

Therefore, it is a primary object of the present invention to provide an improved in-situ corrosion inhibitor designed for admixture with raw or wet concrete mixture, in which metallic reinforcements are placed.

It is a further object of the present invention to provide an improved formulation for use in admixture with raw or wet concrete mixtures wherein the formulation provides protection for the metallic reinforcements without adversely affecting the curing rate or ultimate strength of the concrete.

It is yet a further object of the present invention to provide an improved formulation for use in contact with concrete structures and wherein the formulation provides protection for the metallic reinforcements while significantly increasing the quantity of ecologically friendly components.

Other and further objects of the present invention will become apparent to those skilled in the art upon a study of the following specification and appended claims.

DESCRIPTION OF THE PREFERRED EMBODIMENTS

When designed for incorporation in raw or wet concrete, the present invention utilizes a mixture having the formulation which employs a combination of sodium glucoheptonate with sodium molybdate in accordance with the following:

TABLE I

| Component | Percent by Weight |
| --- | --- |
| Sodium glucoheptonate | 35% by weight |
| Sodium molybdate | 10% by weight |
| Water | 55% by weight. |

Sodium molybdate, when utilized as a metal passivator in concrete suffers from the disadvantage of the formation of an almost insoluble calcium molybdate. It has been recognized chemically that the substantial insolubility of calcium molybdate can be remedied by calcium complexing utilizing glucoheptonate. In the present circumstance, the molybdate which previously had been employed may be at least in part replaced by glucoheptonate in such a way that the molybdate necessary for the corrosion protection capability is significantly decreased.

Typically, the mixtures of the present invention comprise a mixture of sodium glucoheptonate and sodium molybdate in an amount ranging from 32% by weight to 38% by weight sodium glucoheptonate, balance sodium molybdate and water. Generally, and for most purposes, a ratio of between about 34% by weight and 36% by weight is preferred, with a specific formulation of 35% by weight sodium glucoheptonate, balance sodium molybdate and water having been found to be highly effective. The passivator component, sodium molybdate is generally preferred in a range of from 8% to 12% by weight in solutions.

When added to raw or wet concrete, an amount of between about 16 ounces and 48 ounces per cubic yard of raw concrete has been found highly effective, in amounts as low as about 8 ounces per cubic yard have also been found to be useful.

As alternatives to sodium glucoheptonate and sodium molybdate, other salts may be suitably employed. For glucoheptonates, other alkali metal salts including sodium, potassium and ammonium may be employed. Zinc gluconates may also be useful, particularly when used on concrete surfaces. Zinc gluconate extends the useful life of the formulations, and may be used in an amount ranging from between about 3% by weight to about 10% by weight of alkali metal glucoheptonates. Borogluconates have been found useful as well. For the molybdate component, alkali metal salts of other commercially available molybdates may also be employed, provided the solubility is preserved when in admixture with raw or wet concrete.

Suitable wetting agents or other components may be added in order to enhance the ability of the inhibitor to migrate along the surface of the reinforcement.

EXAMPLE I

A corrosion inhibiting mixture was prepared in accordance with the following formulation:

| Component | Percent by Weight |
| --- | --- |
| Sodium glucoheptonate | 35% by weight |
| Sodium molybdate | 10% by weight |
| Water | 55% by weight. |

This formulation was provided in admixture with raw concrete in an amount of 16 ounces by weight per cubic yard of concrete for inhibiting the corrosion of metallic reinforcements.

EXAMPLE II

A corrosion inhibiting mixture was prepared in accordance with the following formulation:

| Component | Percent by Weight |
| --- | --- |
| Potassium glucoheptonate | 85% by weight |
| Potassium molybdate | 15% by weight. |

This formulation was provided in admixture with raw concrete in an amount of 8 ounces by weight per cubic yard of raw concrete for inhibiting the corrosion of metallic reinforcements.

EXAMPLE III

A corrosion inhibiting mixture was prepared in accordance with the following formulation:

| Component | Percent by Weight |
| --- | --- |
| Ammonium gluconate | 85% by weight |
| Ammonium molybdate | 15% by weight. |

This formulation was provided in admixture with raw concrete in an amount of 8 ounces by weight per cubic yard of raw concrete for inhibiting the corrosion of metallic reinforcements.

EXAMPLE IV

A corrosion inhibiting mixture was prepared in accordance with the following formulation:

| Component | Percent by Weight |
| --- | --- |
| Sodium glucoheptonate | 8% by weight |
| Sodium molybdate | 2% by weight |
| Water | 90% by weight. |

This formulation was provided in admixture with raw concrete in an amount of 48 ounces by weight per cubic yard of raw concrete for inhibiting the corrosion of metallic reinforcements.

EXAMPLE V

A corrosion inhibiting mixture was prepared in accordance with the following formulation:

| Component | Percent by Weight |
| --- | --- |
| Sodium glucoheptonate | 17% by weight |
| Sodium molybdate | 5% by weight |
| Water | 78% by weight. |

This formulation was provided in aqueous working solution in an amount of 16 ounces by weight per gallon of water and applied to the surface of cured concrete for inhibiting the corrosion of metallic reinforcements.

EXAMPLE VI

A corrosion inhibiting mixture was prepared in accordance with the following formulation:

| Component | Percent by Weight |
|---|---|
| Potassium gluconate | 42% by weight |
| Potassium molybdate | 42% by weight. |

This formulation, which included potassium gluconate and potassium molybdate on a 50:50 solids basis, was provided in aqueous solution in an amount of 16 ounces by weight per gallon of water and this formulation was applied to the surface of cured concrete for inhibiting the corrosion of metallic reinforcements in a working solution containing approximately 8 ounces of formulation in a gallon of water.

EXAMPLE VII

A corrosion inhibiting mixture was prepared in accordance with the following formulation:

| Component | Percent by Weight |
|---|---|
| Sodium glucoheptonate | 32% by weight |
| Zinc gluconate | 3% by weight |
| Sodium molybdate | 10% by weight |
| Water | 55% by weight. |

The formulation was provided in aqueous solution in an amount of 16 ounces by weight per gallon of water and this formulation was applied to the surface of cured concrete for inhibiting the corrosion of metallic reinforcements.

As has been indicated in the above examples, the range, on a solids basis, of the glucoheptonate component to the molybdate component is typically between 66% and 90% glucoheptonate, balance molybdate passivator. It is noted, however, that in Example VI, the molybdate ratio was increased with satisfactory results.

The utilization of the formulations based upon mixtures in accordance with the present invention enhance the lifetime of metallic reinforcements so as to preserve the integrity of concrete structures, particularly highways, bridges and automobile parking facilities. The widespread utilization of chloride-containing salts such as sodium chloride and calcium chloride, while necessary for safety purposes, have been detrimental to the integrity of reinforced concrete structures. Automobiles carry certain residual amounts of these chloride-containing materials onto areas which are not normally exposed, but which nevertheless are adversely affected by relatively rapid deterioration of the metallic reinforcements.

Reinforced concrete structures are typically provided with steel bars and/or rods for longitudinal tension reinforcement as well as compression reinforcement, and reinforcement against diagonal tension. Expanded metal, steel-wire mesh, hoop iron or other thin rods may be embedded in the concrete structure for reinforcement purposes. Being ferrous-based materials, and as indicated hereinabove, the integrity of the reinforcement is subject to deterioration whenever exposure to chloride-containing salts, oxides of sulfur or nitrogen are encountered. When mixtures containing the formulations of the present invention are utilized in the concrete on an in-situ basis, significant protection of the reinforcement is obtained.

Sodium molybdate has been widely used in the past as an inhibitor for ferrous and non-ferrous metals. One advantage of sodium molybdate compared with other passivators such as nitrites and chromates is its relatively low toxicity. However, one disadvantage of the use of molybdates in environments rich in calcium is the relatively rapid precipitation of substantially aqueous insoluble calcium molybdate which removes the molybdate from the reaction involved. However, the presence of glucoheptonates in the ratios provided herein have been found to create a synergistic effect between the two components, thereby permitting the molybdate to be replaced in significant part by a glucoheptonate. In this environment, it is believed that a reaction occurs between the surface of the metallic element, the passivating component, and the polyhydroxy-carboxylates. When borogluconate is employed as the gluconate, this component was found adsorbed on the surface of a ferrous sample and accordingly incorporated in the oxide passive layer. The influence of the oxide film containing glucoheptonates in this environment has been confirmed by testing with prolonged exposure of the metal to the inhibitor of the present invention, followed by exposure to solutions saturated in oxygen.

To enhance mixing of the formulation of the present invention with wet or raw concrete, it is sometimes desirable to blend the formulation with an inert carrier in order to enhance the dispersion of the formulation within the wet concrete. Inert carriers for blending into wet concrete are, of course, well known, with silica powder being one of many examples.

The performance of aqueous solutions on cured concrete structures may be improved through the addition of ammonium benzoate as a surfactant or dispersant to increase the rate of migration of the aqueous solution into the cured concrete and hence into contact with the surface of the metallic reinforcements. The liquid form of glucoheptonates, the β form, is available commercially and is generally preferred, although the solid form, the α form may be utilized.

It will be appreciated that various modifications may be made in the present invention, and that the formulations provided hereinabove are deemed representative only and are not to be deemed limiting for the true spirit and scope of the invention.

What is claimed is:

1. A corrosion inhibitor for reducing corrosion of metallic reinforcement within concrete structures comprising a mixture of the following formulation:

(a) a glucoheptonate selected from the group consisting of alkali metal glucoheptonates in the range of between about 30% by weight to 37% by weight;

(b) a zinc gluconate in the range of between about 1% by weight to about 3% by weight of alkali metal glucoheptonate;

(c) a molybdate selected from the group consisting of alkali metal molybdates in the range of from between about 8% by weight to 12% by weight;

(d) water in the range of from between about 52% to 58%; and (e) wherein the formulation is provided in admixture with raw concrete in an amount ranging from between about 8 ounces by weight and 48 ounces by weight per cubic yard.

2. The formulation of claim 1 wherein the admixture is in an amount of about 16 ounces by weight per cubic yard of raw concrete.

* * * * *